(12) United States Patent
Pandoh et al.

(10) Patent No.: US 7,548,507 B2
(45) Date of Patent: Jun. 16, 2009

(54) METHOD CONSTRUCTING A DOWNLINK FRAME FOR A COMMUNICATION SYSTEM

(75) Inventors: Puneet Pandoh, Portland, OR (US);
Balaji Rengarajan, Hillsboro, OR (US);
Muthaiah Venkatachalam, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 628 days.

(21) Appl. No.: 11/395,342

(22) Filed: Mar. 31, 2006

(65) Prior Publication Data

US 2007/0230326 A1    Oct. 4, 2007

(51) Int. Cl.
*H04J 11/00* (2006.01)
(52) U.S. Cl. .................... 370/208; 370/474; 370/477
(58) Field of Classification Search .............. 370/203, 370/208, 209, 474, 476, 477, 479; 375/260
See application file for complete search history.

(56) References Cited

U.S. PATENT DOCUMENTS

2005/0002323 A1*  1/2005  Hadad ..................... 370/203
2005/0201269 A1*  9/2005  Shim et al. .............. 370/208

\* cited by examiner

*Primary Examiner*—Ricky Ngo
*Assistant Examiner*—Pao Sinkantarakorn
(74) *Attorney, Agent, or Firm*—Law Office of Donald D. Mondul

(57) ABSTRACT

A method constructing a downlink frame for a communication system using a plurality of coding schemes and a quality metric. The method includes: (a) In no particular order: (1) establishing stripes along a first axis; (2) establishing slots within each stripe; and (3) assigning each flow to a group according to its coding scheme. (b) Evaluating a wastage metric for each group. (c) Evaluating the quality metric for each group. (d) Employing the wastage metric and the quality metric to establish an efficiency metric for each group. (e) Allocating a first group having a predetermined efficiency metric to a first stripe. (f) Continuing allocating until all stripes are filled to desired capacity or until all flows are fully allocated. (g) Populating the frame according to the allocating.

20 Claims, 5 Drawing Sheets

METHOD CONSTRUCTING A DOWNLINK FRAME FOR A COMMUNICATION SYSTEM

BACKGROUND

Institute of Electrical and Electronic Engineers (IEEE) Standard 802.16 is an industry standard developed for worldwide interoperability for microwave access (the WiMAX standard). This WiMAX standard is intended to enhance delivery of data services over broadband wireless communication links. Among the requirements for implementing the WiMAX standard is the creating of downlink OFDMA (Orthogonal Frequency Division Multiplexing Access) communication frames for packet communications according to particular requirements. For purposes of this disclosure, a downlink is a communication link from a system to an end user.

There is a need for a method creating a downlink OFDMA WiMAX frame that is efficient and therefore accomplishes frame creating quickly. Improved speed and efficiency in frame creation enhances data throughput and enhances quality of service in WiMAX base stations in wireless communication systems.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
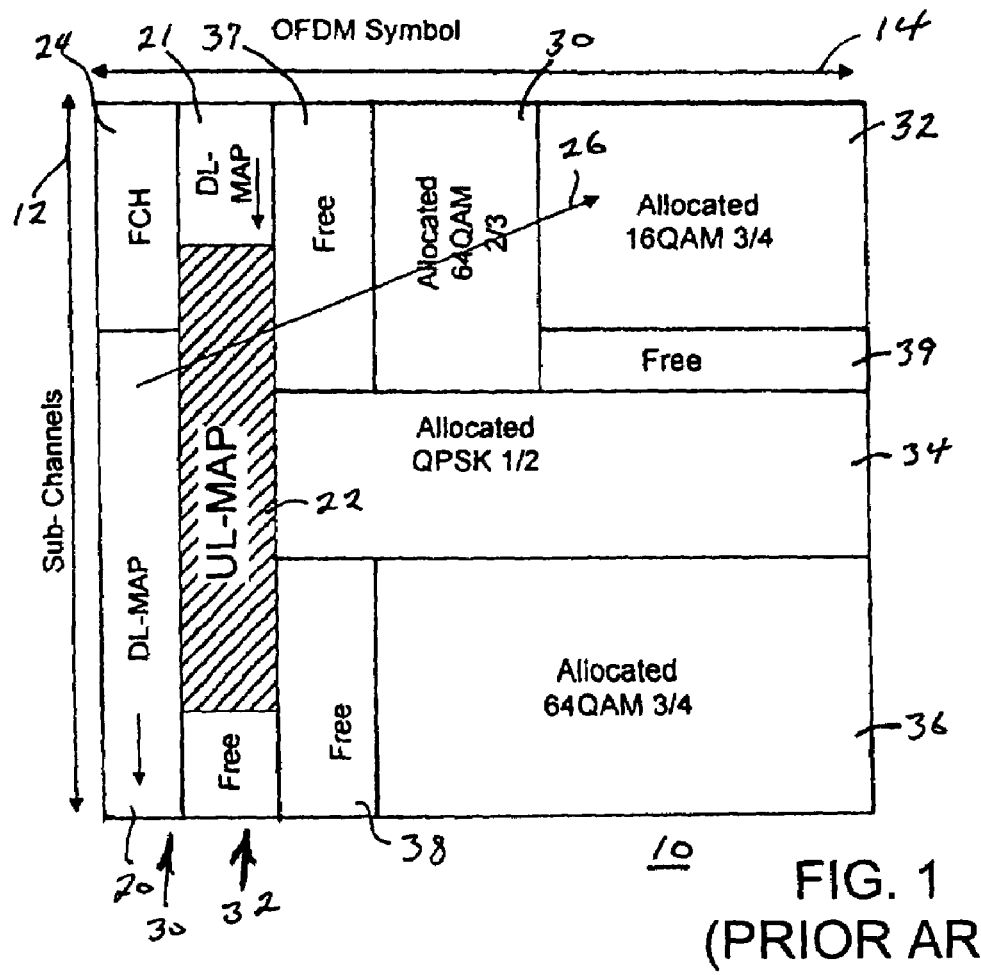
FIG. 1 is a schematic diagram of a representative prior art downlink frame.

It will be appreciated that for simplicity and clarity of illustration, elements illustrated in the figures have not necessarily been drawn to scale. For example, the dimensions of some of the elements are exaggerated relative to other elements for clarity. Further, where considered appropriate, reference numerals have been repeated among the figures to indicate corresponding or analogous elements.

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

Some portions of the detailed description that follows are presented in terms of algorithms and symbolic representations of operations on data bits or binary digital signals within a computer memory. These algorithmic descriptions and representations may be the techniques used by those skilled in the data processing arts to convey the substance of their work to others skilled in the art.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

Embodiments of the present invention may include apparatuses for performing the operations herein. An apparatus may be specially constructed for the desired purposes, or it may comprise a general purpose computing device selectively activated or reconfigured by a program stored in the device. Such a program may be stored on a storage medium, such as, but not limited to, any type of disk including floppy disks, optical disks, compact disc read only memories (CD-ROMs), magnetic-optical disks, read-only memories (ROMs), random access memories (RAMs), electrically programmable read-only memories (EPROMs), electrically erasable and programmable read only memories (EEPROMs), magnetic or optical cards, or any other type of media suitable for storing electronic instructions, and capable of being coupled to a system bus for a computing device.

The processes and displays presented herein are not inherently related to any particular computing device or other apparatus. Various general purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein. In addition, it should be understood that operations, capabilities, and features described herein may be implemented with any combination of hardware (discrete or integrated circuits) and software.

It should be understood that embodiments of the present invention may be used in a variety of applications. Although the present invention is not limited in this respect, the devices disclosed herein may be used in many apparatuses such as in the transmitters and receivers of a radio system. Radio systems intended to be included within the scope of the present invention include, by way of example only, cellular radiotelephone communication systems, satellite communication systems, two-way radio communication systems, one-way pagers, two-way pagers, personal communication systems (PCS), personal digital assistants (PDA's), wireless local area networks (WLAN), personal area networks (PAN), metropolitan area network (MAN), broadband wireless networks and the like.

Types of cellular radiotelephone communication systems intended to be within the scope of the present invention include, although not limited to, Code Division Multiple Access (CDMA) cellular radiotelephone communication systems, Global System for Mobile Communications (GSM) cellular radiotelephone systems, North American Digital Cellular (NADC) cellular radiotelephone systems, Time Division Multiple Access (TDMA) systems, Extended-TDMA (E-TDMA) cellular radiotelephone systems, third generation (3G) systems like Wide-band CDMA (WCDMA), CDMA-2000, worldwide interoperability for microwave access (WiMAX) wireless systems, Orthogonal Frequency Division Multiplexing Access (OFDMA) systems and the like.

In the IEEE WiMAX Standard (IEEE Standard 802.16) specification, best effort flows have two mandatory Quality of Service (QoS) parameters: (1) maximum sustained rate; and (2) traffic priority. There are a maximum of eight traffic priorities that may be involved. By way of example and not by way of limitation, representative real time data streams that support such communication services as T1/E1 lines and Voice over Internet Protocol (VoIP) may have the following mandatory Quality of Service (QoS) parameters: (a) maximum reserved traffic rate; (b) maximum latency; and (c) tolerated jitter.

Another important factor in bandwidth allocations may be the quality of an individual user's wireless channel. On a wireless channel the quality of transmissions may be time varying, thereby introducing different error levels at different points in time. The varying nature of a wireless channel may be sought to be compensated by using adaptive modulation and coding (AMC) by which a modulation and coding scheme (MCS) level may be chosen based on the instantaneous channel quality observed.

Based on the above parameters, a WiMAX base station may allocate bandwidth between active service flows such that each flow may meet its quality of service (QoS) requirements. A "service flow" is a term used here to indicate a communication data flow having a particular modulation and coding scheme (MCS). By way of example and not by way of limitation, one flow may involve VoIP (Voice over Internet Protocol) communication data, another flow may involve Internet browsing communication and other flows may also be simultaneously supported by a communication system. Different algorithms have been created to meet quality of service requirements while effecting the required allocation of bandwidth. A successful algorithm will achieve higher system throughput by allowing either more QoS flows or providing more bandwidth to best effort flows while still maintaining QoS requirements.

FIG. 1 is a schematic diagram of a representative prior art downlink frame. In FIG. 1, a WiMAX OFDMA downlink frame 10 may be oriented along a sub-channel axis 12 and an OFDM (Orthogonal Frequency Division Multiplexing) Symbol axis 14. Axes 12, 14 may be orthogonal. Sub-channel axis 12 may be frequency-related. OFDM Symbol axis 14 may be time-related.

As required by the IEEE 802.16 WiMAX Standard specification, WiMAX OFDMA downlink frame 10 may be divided into data areas in the shape of rectangles, including by way of example and not by way of limitation downlink map (DL-MAP) 20, uplink map (UL-MAP) 22 and frame control header (FCH) 24. DL-MAP may be observed to occupy two rectangular areas 20, 21 in two adjacent columns or stripes 30, 32. Frame control header (FCH) 24 may share column 30 with DL-MAP 20. UL-MAP 22 may share column 32 with DL-MAP portion 21. DL-MAP 20, 21 may contain information relating to positioning of identified flow stored in frame 10, as indicated schematically in FIG. 1 by an arrow 26. A flow may be a queue of data packets that are modulated and sent in a frame. Each data packet in a flow may contain a plurality of data units or bytes of information. The relation between DL-MAP 20, 21 and flows stored in frame 10 is not pertinent to the present invention and will therefore not be discussed further herein.

Data may be allocated within frame 10 in flows identified by coordinate combinations of sub-channel designations related with axis 12 and OFDM symbols related with axis 14. As specified by the IEEE 802.16 WiMAX Standard, data may be stored in representative OFDMA frame 10 in rectangles 30, 32, 34, 36. Rectangles 30, 32, 34, 36 may be designated to receive flows relating to different modulation and coding schemes (MCS). In such manner, rectangle 30 may be allocated flows having an MCS 64QAM ⅔. Rectangle 32 may be allocated flows having an MCS 16QAM ¾. Rectangle 34 may be allocated flows having an MCS QPSK ½. Rectangle 36 may be allocated flows having an MCS 64QAM ¾. Rectangles 30, 32, 34, 36 may not have equal widths measured along axis 14. One may also note that rectangles 30, 32, 34, 36 may not have equal lengths measured along axis 12.

Rectangles 37, 38, 39 may have no flows allocated, and are therefore designated as "Free" in FIG. 1, meaning that rectangles 37, 38, 39 may be available to receive flows.

As also specified by the IEEE 802.16 WiMAX Standard, rectangles in representative OFDMA frame 10 may be further divided into units called slots.

Figure 2:
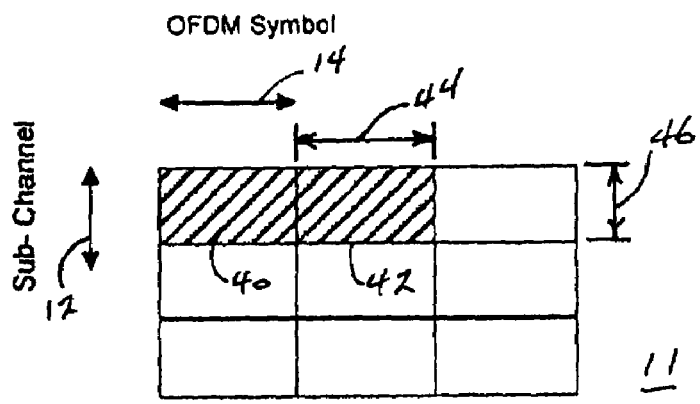
FIG. 2 is a schematic diagram of a detail of a representative prior art downlink frame.

FIG. 2 is a schematic diagram of a detail of a representative prior art downlink frame. In FIG. 2, a portion 11 of OFDMA frame 10 (FIG. 1) may be illustrated oriented along sub-channel axis 12 and OFDM (Orthogonal Frequency Division Multiplexing) Symbol axis 14. In accordance with the IEEE 802.16 WiMAX Standard, slots 40, 42 may have an equal horizontal expanse or width and an equal vertical expanse or depth. By way of example and not by way of limitation slot 42 may have a width 44 of two symbols (measured along axis 14) and a depth 46 of one sub-channel (measured along axis 12). The MCS level of flows contained in a respective slot 40, 42 may determine how many bytes of information are contained in the respective slot 40, 42. By way of example and not by way of limitation, 27 bytes of information may be contained in a slot holding information having an MCS of 64QAM ¾. Positions of rectangles 30, 32, 34, 36, 37, 38, 39 in frame 10 may be specified in Downlink Map (DL-MAP) 20, 21 (FIG. 1). Each entry-recording location of a rectangle contained in DL-MAP 20, 21 may take 4.5 bytes and may be coded with a robust modulation such as QPSK ½ (6 bytes per slot), preferably using a repetition of 2 times for robustness. It is possible to create a rectangle for a single flow, however allocating a rectangle for each flow may increase the size of DL-MAP 20, 21 and may increase the overhead of DL-MAP 20, 21. That is, allocating a rectangle for each flow may cause DL-MAP 20, 21 to occupy a larger portion of frame 10, thereby leaving less of frame 10 available for allocating communication-related flows. It is possible to allocate multiple flows which have the same MCS in a single rectangle to reduce the overhead of DL-MAP 20, 21.

A result is that the IEEE 802.16 WiMAX Standard requires an allocation scheduling algorithm to ensure that its allocations from different flows should complete a rectangle within a frame in so far as may efficiently accomplished. If a a flow exceeds space available in a given rectangle, the packet may be segmented and sent in a next or later frame. Such later frame scheduling is preferred over creating a new partially filled rectangle in an extant frame, thereby inefficiently wasting space in the extant frame.

There are prior art bandwidth allocation algorithms that take into account, the channel conditions and the Quality of Service (QoS) requirements of users. However, the prior art algorithms do not take into account the rectangular data allocation requirement discussed above which is unique to WiMAX-OFDMA systems.

To account for the required QoS and channel conditions, prior art algorithms generally define a Metric M_QoS(i,t) for a user i at time t. This metric M_QoS(i,t) does not reflect the rectangular data allocation constraints for a WiMAX-OFDMA system frame. One example of such a prior art algorithm is a MLWDF (Modified Largest Weighted Delay First) known to those skilled in the art.

In a MLWDF algorithm, every packet served from a flow for allocation to a frame will have a metric attached to it. The attached metric is defined for a flow at time t:

$$M\_QoS(i,t) = c(i) * (\mu(i,t)/A(i,t)) * W(i,t)$$

Where, $\mu(i,t)$=is instantaneous channel capacity expressed in terms of bytes per slot at time t for flow i;

A(i,t)=is mean channel of flow i, computed according to a moving average function;

W(i,t)=a function of queue length for flow i at time t; and c(i)=a constant relating to relative priority for flow i.

A method is needed which tracks wastage and minimizes the wastage in a rectangle (consisting of different flows) and also keeps track of Qos and channel conditions of the flows before deciding to either segment the data or delay the sending of the data.

Figure 3:
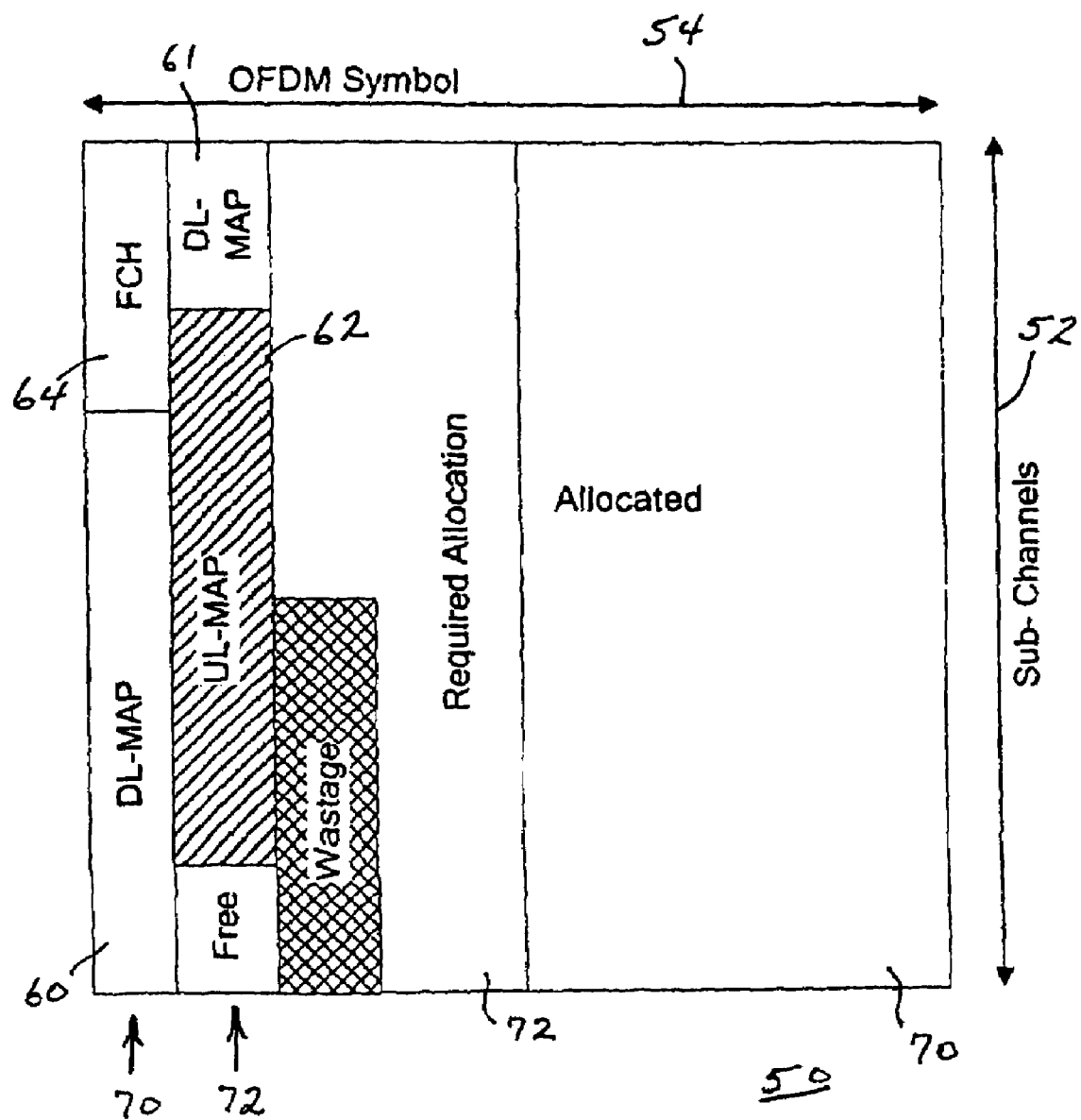
FIG. 3 is a schematic diagram of a representative downlink frame configured according to the present invention.

FIG. 3 is a schematic diagram of a representative downlink frame configured according to the present invention. In FIG. 3, a WiMAX OFDMA downlink frame 50 may be oriented along a sub-channel axis 52 and an OFDM (Orthogonal Frequency Division Multiplexing) Symbol axis 54. Axes 52, 54 may be orthogonal. Sub-channel axis 52 may be frequency-related. OFDM Symbol axis 54 may be time-related.

As required by the IEEE 802.16 WiMAX Standard specification, WiMAX OFDMA downlink frame 50 may be divided into data areas in the shape of rectangles, including by way of example and not by way of limitation downlink map (DL-MAP) 60, uplink map (UL-MAP) 62 and frame control header (FCH) 64. DL-MAP may be observed to occupy two rectangular areas 60, 61 in two adjacent columns or stripes 70, 72. Frame control header (FCH) 64 may share column 70 with DL-MAP 60. UL-MAP 62 may share column 72 with DL-MAP portion 61.

Data may be allocated within frame 50 in flows identified by coordinate combinations of sub-channel designations related with axis 52 and OFDM symbols related with axis 54. As specified by the IEEE 802.16 WiMAX Standard, data may be stored in representative OFDMA frame 50 in rectangles. At least a portion of the novelty of the present invention may reside in the efficient formation of rectangles in conformance with the IEEE 802.16 WiMAX Standard.

The method of the present invention may employ a concept of data groups or "MCS buckets" (an MCS bucket may be a group of flows which contain data packets) to create OFDMA WiMAX downlink frame 50 (FIG. 3), generally as follows:

1. OFDMA WiMAX downlink frame 50 may be divided into rectangles having equal width along axis 54 and accommodating the maximum available and permissible number of slots along axis 52. There may be thus established a set of vertical stripes of generally equal lengths in allocated rectangle 70 of frame 50. Each stripe may have a length generally parallel with axis 52 equal to maximum number of sub-channels in a frame and the minimum possible width of two OFDMA symbols generally parallel with axis 54, assuming PUSC (Partially Used SubChannelization) mode. Some portions of frame 50 may not be available for allocating flows because overhead or other required data may be allocated to the unavailable portion, as indicated by "Required Allocation" portion 72.

2. Data groups or "MCS buckets" may be formed by aggregating all the flows that use the same MCS level for the extant OFDMA WiMAX downlink frame 50. Note that with changing channel conditions, the MCS level of a flow may change with time and hence its association to a particular MCS bucket may also change.

3. Since the flows belonging to a bucket are desired to neatly form a rectangle (required by the IEEE 802.16 WiMAX Standard), a wastage metric M_waste may be established for each bucket. Metric M_waste of each bucket may be calculated based on the wastage for a single stripe. Wastage metric M_waste may be defined as:

$$M\_waste = F(Wf) \qquad [1]$$

where,

Wf=SlotsUsedInThisStripe/MaxSlotsInOneStripe;
MaxSlotsInOneStripe=number of slots available in one stripe; and
SlotsUsedInThisStripe=Minimum of MaxSlotsInOneStripe and sum of slots required for all the packets in all the flows belonging to this MCS bucket).

On inspection one may note that Wf≦1 always, and F(Wf) is a monotonically decreasing function of (Wf).

As an example let x=(Wf), F(x)=1−x. F(x) may be chosen depending upon how much weighting one wishes to give the QoS constraints of a flow versus bandwidth wastage resulting from required WiMAX rectangle formation. As a special case, if one requires only best effort flows in the system, one may choose a very aggressive F(x) which gives a lot of weight to the WiMAX requirement for rectangular stripes in a frame, and thereby offsets most of the weighting for QoS.

M_waste may be calculated for each bucket using Expression [1] above. Wastage metric M_waste thus calculated for each data group or MCS bucket may then be applied to all the flows in the bucket, 4. Once M_waste(i) and M_QoS(i) are available for each flow-i, an efficiency metric M_eff(i) for the head of the line packet in flow-i may be calculated as:

$$M\_eff(i) = M\_waste(i) * M\_QoS(i) \qquad [2]$$

5. Based on efficiency metric M_eff(i) calculated above for each flow-i, the flow with the largest M_eff(i) may be chosen to be scheduled. Allocation may be performed for the flow which has the highest metric M_eff(i) by giving it one extant stripe and the head of the line packet from this flow may be allocated in the extant stripe If the head of line packet is larger than the stripe length (i.e., the number of slots available) of the extant stripe, then the head of the line packet may be fragmented to permit fitting the head of the line packet into the extant stripe 6. Once allocation is completed to the extant stripe, metric M_waste (Expression [1]) may be recalculated and the process may be repeated from step 3 until either all flows are scheduled for the extant OFDMA WiMAX downlink frame 50 or until the extant frame becomes full and has no more stripes available.

After all the allocation of the packet associated with an MCS bucket is carried out to the extant or current frame, segmentation of the packet may be carried out for the flow which received an allocation less than the packet size when filling out the last bit of space in the current frame.

The method of the present invention takes into account not only the QoS and the channel conditions for a user for scheduling purposes, but also efficiently satisfies the WiMAX requirement for rectangular stripes in a frame.

By taking into account the WiMAX requirement for rectangular stripes in a frame simultaneously while scheduling allocation of flows to the frame, available resources are efficiently utilized hence maximizing number of users supported from a base station.

Despite taking the WiMAX requirement for rectangular stripes in a frame into account, the method of the present invention does not add any additional time complexity to an algorithm as may occur with scheduling algorithms that do not accommodate the WiMAX requirement for rectangular stripes in a frame.

Figure 4:
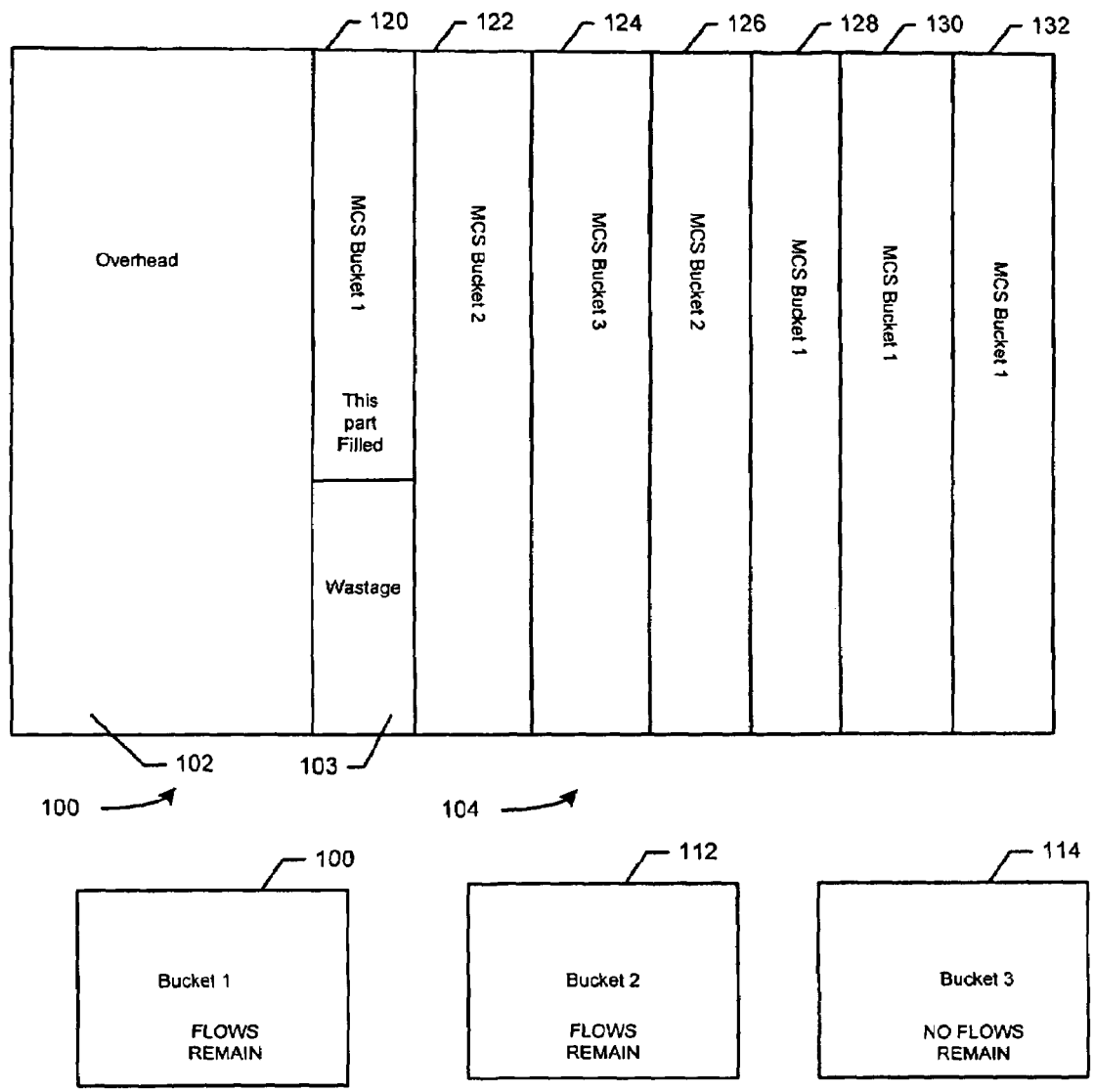
FIG. 4 is a schematic diagram of a representative downlink frame during performance of the method of the present invention.

FIG. 4 is a schematic diagram of a representative downlink frame during performance of the method of the present invention. In FIG. 4, a downlink frame 100 includes an overhead section 102 and a data section 104. Overhead section 102 includes such as a downlink map, an uplink map, a frame control header (FCH) and other similar information of the sort described in connection with rectangles 30, 32 (FIG. 1). Data section 104 is partitioned into a plurality of stripes 120, 122, 124, 126, 128, 130, 132. Data has been virtually scheduled or allocated among stripes within data section 104 according to the method of the present invention, described above in connection with FIG. 2. That is, flows from "MCS Bucket 1" or data group 110 have been identified for allocation to a portion of stripe 120 and have been identified for allocation to substantially fully populate stripes 128, 130, 132. Flows from "MCS Bucket 2" or data group 112 have been identified for allocation to substantially fully populate stripes 122, 136. Flows from "MCS Bucket 3" or data group 114 has have been identified for allocation to substantially fully populate stripe 124. Stripes identified for population by flows from a respective MCS bucket 110, 112, 114 are not necessarily adjacent stripes because the efficiency metric associated with each respective MCS bucket is evaluated periodically as flows are allocated to stripes, such as at the end of each stripe or at the exhaustion of flows in an MCS bucket. The efficiency metric may have changed, by way of example and not by way of limitation, between allocation for populating stripe 120 and allocation for populating stripe 122. Such a reevaluation of the efficiency metric during practice of the method of the present invention may cause flows allocated for populating stripe 120 to come from flows contained in MCS bucket 110 while flows allocated for populating stripe 122 may come from flows contained in MCS bucket 112.

FIG. 4 illustrates a point in time at which the method of the present invention has completed a virtual allocation of flows to populate stripes in frame 100. The method is not yet completed with respect to frame 100 in the circumstance illustrated in FIG. 4. As may be observed in FIG. 4, flows still remain in MCS buckets 110, 112. Those remaining flows may not have been allocated to a remaining unallocated wastage space 103 for any of several reasons including, by way of example and not by way of limitation, that quality of service (QOS) considerations precluded effecting such an allocation.

Figure 5:
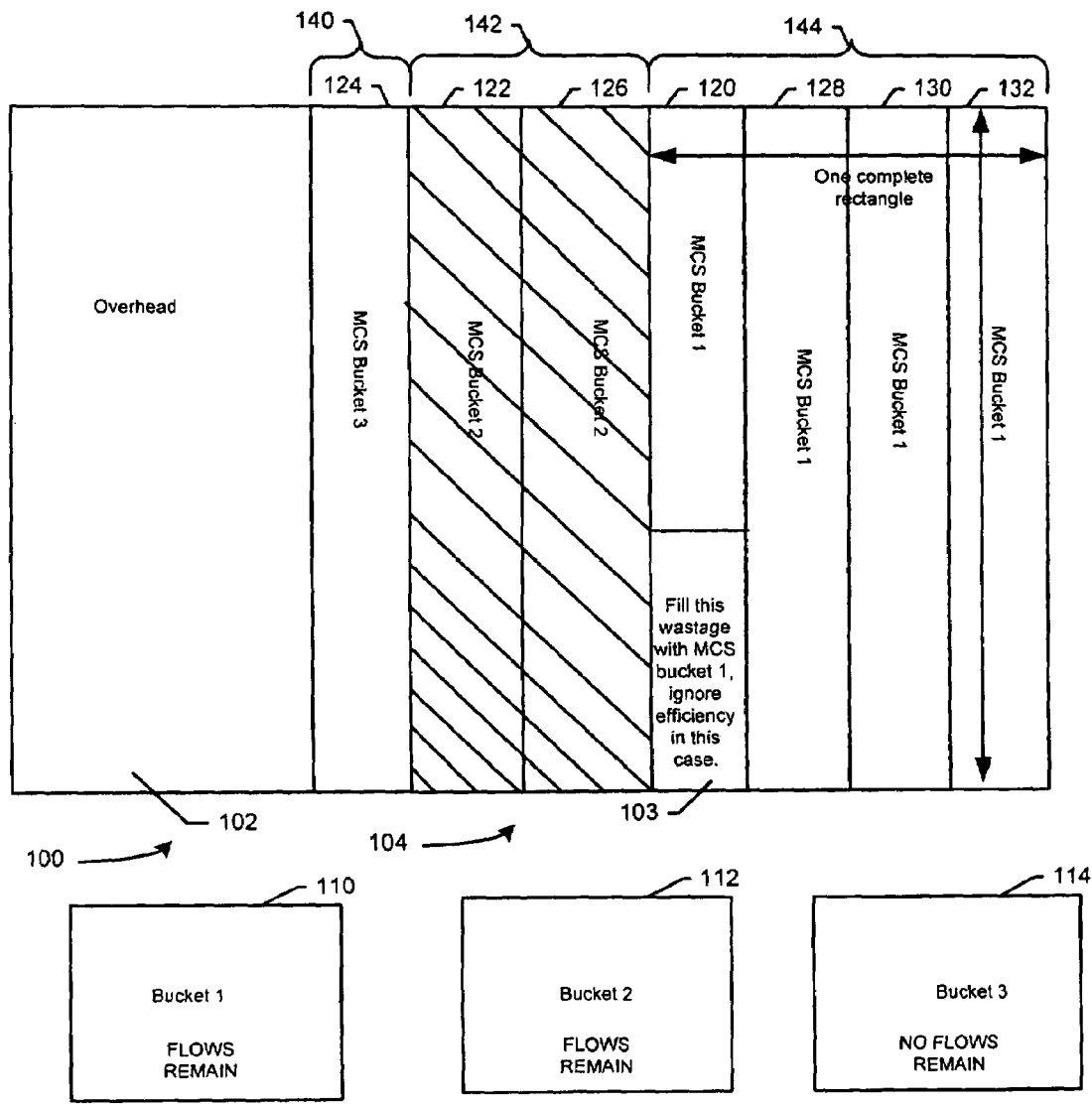
FIG. 5 is a schematic diagram of the downlink frame illustrated in FIG. 4 after completion of the method of the present invention.

FIG. 5 is a schematic diagram of the downlink frame illustrated in FIG. 4 after completion of the method of the present invention. In FIG. 5, frame 100 is general configured as described in connection with FIG. 4 in that frame 100 has an overhead section 102 and a data section 104. In FIG. 5, however, the method of the present invention has been taken a further step so that allocations for populating stripes in data section 104 have been evaluated and stripes allocated for population from like MCS buckets have been arranged in generally adjoining relation. In the resulting configuration of data section 104 rectangles populated by respective MCS buckets are created so that data section 104 now includes rectangle 140 (including flows allocated from MCS bucket 114; previous stripe 124), rectangle 142 (including flows allocated from MCS bucket 112; previous stripes 122, 126) and rectangle 144 (including flows allocated from MCS bucket 110; previous stripes 120, 128, 130, 132). Additional flows have bee employed to substantial fully populate wastage 103 so as to fully populate rectangle 144. A decision to fully populate rectangle 144 may have required An evaluation of criteria employed during earlier steps in the method, such as Quality of Service (QoS) criteria. One may decide to relax of QoS requirements or choose to operate under another exception to effect "tucking in" flows to populate wastage spaces as desired.

Regarding FIGS. 4 and 5 together, one may observe that the method of the present invention may involve a first virtual allocation step that takes into account an efficiency metric in allocating flows from MCS buckets or data groups to slots within a downlink frame. The method also involves a second step in which rectangular data spaces are established in a frame by arranging stripes allocated flows from like MCS buckets in adjoining relation for population with flows to construct a downlink frame frame.

Figure 6:
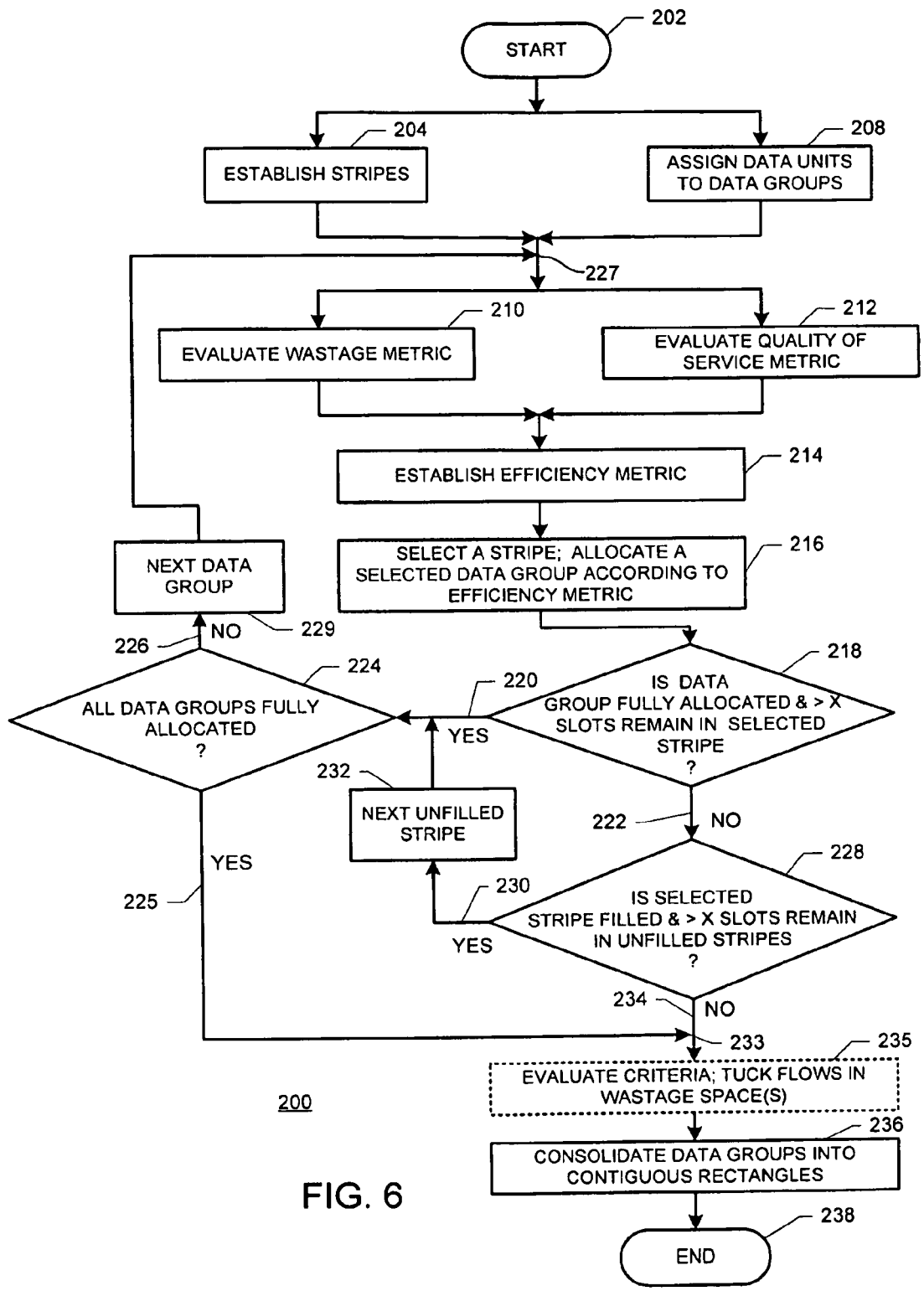
FIG. 6 is a flow chart illustrating the present invention.

FIG. 6 is a flow chart illustrating the present invention. In FIG. 6, a method 200 allocating data in a frame for use in a communication system may begin at a START locus 202. The frame may be configured for arraying a plurality of flows in rectangular patterns at data loci in the frame. The data loci may be identified by respective coordinate pairs measured along a first axis and a second axis. Method 200 may continue with, in no particular order: (1) Establishing a plurality of symbol rectangular data spaces in the frame, as indicated by a block 204. Each respective data space of the plurality of data spaces may present a respective stripe extending substantially one slot width along the first axis and may present a respective plurality of the slots defining a respective length extending along the second axis. (2) Identifying a data group for each respective flow of the plurality of flows according a modulation and coding scheme employed by each respective flow, as indicated by a block 208.

Method 200 may continue with, in no particular order: (1) Evaluating a wastage metric for each respective data group, as indicated by a block 210. (2) Evaluating at least one respective quality of service metric of the at least one quality of service metric for each respective data group, as indicated by a block 212.

Method 200 may continue with employing the wastage metric and the quality of service metric to establish an efficiency metric for each respective data group, as indicated by a block 214.

Method 200 may continue with allocating a first respective data group having a predetermined efficiency metric to a selected stripe of the plurality of stripes, as indicated by a block 216.

Method 200 may continue, posing a query whether the first respective data group is fully allocated and more than a predetermined number of the plurality of slots remain in the selected stripe, as indicated by a query block 218. If the response to the query posed at query block 218 is affirmative, method 200 may proceed via YES response line 220 to a query block 224.

Query block 224 may pose a query whether all data groups have been fully allocated to the frame. If all data groups have been fully allocated to the frame, method 200 may proceed via YES response line 225 to a locus 233 and method 200 may proceed from locus 233 to terminate at an END locus 238, as will be hereinafter described. If all data groups have not been fully allocated to the frame, method 200 may proceed via NO response line 226, may obtain a next data group, as indicated by a block 229 and may proceed to a locus 227. Method 200 may then proceed from locus 227 as indicated by blocks 210, 212, 214 216, 218 as described above.

If the response to the query posed at query block 218 is negative, method 200 may proceed via NO response line 222 to a query block 228. Query block 228 may pose a query whether the selected stripe is filled and more than a predetermined number of the plurality of slots remain in remaining unfilled stripes are unfilled slots. If the selected stripe is filled and more than a predetermined number of the plurality of slots remain in remaining unfilled stripes are unfilled slots, method 200 may proceed via YES response line 230, may obtain a next unfilled stripe, as indicated by a block 232 and may proceed to a query block 224.

As described earlier herein, query block 224 may pose a query whether all data groups have been fully allocated to the frame. If all data groups have been fully allocated to the frame, method 200 may proceed via YES response line 225 to locus 233 and method 200 may proceed from locus 233 to terminate at an END locus 238, as will be hereinafter described. If all data groups have not been fully allocated to the frame, method 200 may proceed via NO response line 226, may obtain a next data group, as indicated by a block 229 and may proceed to locus 227. Method 200 may then proceed from locus 227 as indicated by blocks 210, 212, 214 216, 218, 228 as described above.

If the selected stripe is filled and more than a predetermined number of the plurality of slots do not remain in remaining unfilled stripes, method 200 may proceed from query block 228 via NO response line 234 to locus 233. Method 200 may proceed from locus 233 to populate respective stripes of the plurality of stripes according to the allocating, as indicated b a block 236. Method 200 may terminate at an END locus 238.

Method 200 may, if desired, effect an evaluating (indicated by a block 235) of at least one quality of service metric to determine whether to allocate still-unallocated flows to wastage spaces remaining in the frame before effecting the populating indicated by block 236. This step is an optional step, as indicated by the dotted line depiction of block 235.

While certain features of the invention have been illustrated and described herein, many modifications, substitutions, changes, and equivalents will now occur to those skilled in the art. It is, therefore, to be understood that the appended claims are intended to cover all such modifications and changes as fall within the true spirit of the invention.

The invention claimed is:

1. A method for constructing a downlink frame for a communication system; said communication system handling communication data using a plurality of modulation and coding schemes; said communication system scheduling said communication data for treatment according to predetermined criteria including at least one quality of service metric; said communication system requiring said communication data be established in a plurality of flows arranged in a plurality of substantially rectangular sub-frames in said downlink frame; each respective flow of said plurality of flows being identifiable by a respective coordinate pair measured along a first axis and a second axis; the method comprising:
    (a) in no particular order:
        (1) establishing a plurality of symbol space stripes along at least a portion of said first axis; each respective symbol space stripe of said plurality of symbol space stripes accommodating a plurality of symbol space slots along said second axis; each said slot having a slot width along said first axis; each said respective stripe having a width substantially equal to at least one said slot width along said first axis;
        (2) assigning each said respective flow to a respective data group of at least one data group according said modulation and coding scheme employed by said respective flow;
    (b) in no particular order:
        (1) evaluating a wastage metric for each respective said data group; and
        (2) evaluating at least one respective quality of service metric of said at least one quality of service metric for each said respective data group;
    (c) employing said wastage metric and said quality of service metric to establish an efficiency metric for each said respective data group;
    (d) allocating a first said respective data group having a predetermined efficiency metric to a first stripe of said plurality of stripes;
    (e) if said first respective data group is fully allocated and more than a predetermined number of said plurality of slots remain in said first stripe, carry out steps (b) through (d) for said first stripe for a next said respective data group;
    (f) if said first stripe is filled and more than a predetermined number of said plurality of slots in unfilled stripes of said plurality of stripes are empty slots, carry out steps (b) through (e) for a next respective unfilled stripe of said plurality of stripes;
    (g) if said first stripe is filled and less than a predetermined number of said plurality of slots in unfilled stripes of said plurality of stripes are empty slots, carry out step (i);
    (h) if no said respective data group remains unallocated to said frame, carry out step (i);
    (i) populating respective stripes of said plurality of stripes according to said allocating; and
    (j) ending the method for said frame.

2. The method for constructing a downlink frame for a communication system as recited in claim 1 wherein said wastage metric evaluates an amount of slot capacity remaining within a respective said stripe after allocation of a respective said data group to said respective stripe.

3. The method for constructing a downlink frame for a communication system as recited in claim 2 wherein said predetermined efficiency metric is the highest efficiency metric among said at least one data group.

4. The method for constructing a downlink frame for a communication system as recited in claim 2 wherein step (i) includes evaluating at least one respective quality of service metric of said at least one quality of service metric to determine whether to allocate still-unallocated flows to wastage spaces remaining in said frame before effecting said populating.

5. The method for constructing a downlink frame for a communication system as recited in claim 1 wherein said predetermined efficiency metric is the highest efficiency metric among said at least one data group.

6. The method for constructing a downlink frame for a communication system as recited in claim 5 wherein step (i)

includes evaluating at least one respective quality of service metric of said at least one quality of service metric to determine whether to allocate still-unallocated flows to wastage spaces remaining in said frame before effecting said populating.

7. The method for constructing a downlink frame for a communication system as recited in claim 1 wherein step (i) includes evaluating at least one respective quality of service metric of said at least one quality of service metric to determine whether to allocate still-unallocated flows to wastage spaces remaining in said frame before effecting said populating.

8. A method for allocating data in a frame for use in a communication system; said frame being configured for arraying a plurality of flows in rectangular patterns at data loci in said frame; said data loci being identified by respective coordinate pairs measured along a first axis and a second axis; the method comprising:
  (a) in no particular order:
    (1) establishing a plurality of rectangular data spaces in said frame; each respective data space of said plurality of data spaces presenting a respective stripe extending at least one slot width along said first axis and presenting a respective plurality of slots defining a respective length extending along said second axis; and
    (2) identifying a data group for each respective said flow of said plurality of flows according to a modulation and coding scheme employed by each said respective flow;
  (b) in no particular order:
    (1) evaluating a wastage metric for each respective said data group;
    (2) evaluating at least one respective quality of service metric of said at least one quality of service metric for each said respective data group;
  (c) employing said wastage metric and said quality of service metric to establish an efficiency metric for each said respective data group;
  (d) allocating a first said respective data group having a predetermined efficiency metric to a first data space of said plurality of data spaces;
  (e) if said first respective data group is fully allocated and more than a predetermined number of said plurality of slots remain unfilled in said first data space, carry out steps (b) through (d) for said first data space for a next said respective data group;
  (f) if said first data space is filled and more than a predetermined number of said plurality of slots in unfilled data spaces of said plurality of data spaces are empty slots, carry out steps (b) through (e) for a next respective unfilled data space of said plurality of data spaces;
  (g) if said first data space is filled and less than a predetermined number of said plurality of slots in unfilled data space of said plurality of data space are empty slots, carry out step (i);
  (h) if no said respective data group remains unallocated to said frame, carry out step (i);
  (i) populating respective stripes of said plurality of stripes according to said allocating; and
  (j) ending the method for said frame.

9. The method for allocating data in a frame for use in a communication system as recited in claim 8 wherein step (i) includes evaluating at least one respective quality of service metric of said at least one quality of service metric to determine whether to allocate still-unallocated flows to wastage spaces remaining in said frame before effecting said populating.

10. The method for allocating data in a frame for use in a communication system as recited in claim 9 wherein said wastage metric evaluates an amount of slot capacity remaining within a respective said data space after allocation of a respective said data group to said respective data space.

11. The method for allocating data in a frame for use in a communication system as recited in claim 9 wherein said predetermined efficiency metric is the highest efficiency metric among said at least one data group.

12. The method for allocating data in a frame for use in a communication system as recited in claim 8 wherein said wastage metric evaluates an amount of slot capacity remaining within a respective said data space after allocation of a respective said data group to said respective data space.

13. The method for allocating data in a frame for use in a communication system as recited in claim 12 wherein each data space of said plurality of data spaces each has substantially the same length.

14. The method for allocating data in a frame for use in a communication system as recited in claim 8 wherein said predetermined efficiency metric is the highest efficiency metric among said at least one data group.

15. The method for allocating data in a frame for use in a communication system as recited in claim 14 wherein said wastage metric evaluates an amount of slot capacity remaining within a respective said data space after allocation of a respective said data group to said respective data space.

16. The method for allocating data in a frame for use in a communication system as recited in claim 14 wherein each data space of said plurality of data spaces each has substantially the same length.

17. The method for allocating data in a frame for use in a communication system as recited in claim 8 wherein each data space of said plurality of data spaces each has substantially the same length.

18. A method for allocating data in a frame for use in a communication system; said frame being configured for arraying a plurality of flows in rectangular patterns in said frame; the method comprising:
  (a) in no particular order:
    (1) establishing a plurality of substantially equal-area virtual rectangular data spaces in said frame; and
    (2) identifying a respective data group for each respective said flow of said plurality of flows according to a modulation and coding scheme employed by each said respective flow;
  (b) evaluating an efficiency metric for each said respective data group; said efficiency metric being related with a wastage metric and a quality of service metric for each respective said data group;
  (c) effecting a virtual allocation of said plurality of flows from said data groups among said plurality of virtual data spaces in a predetermined order of allocation; said predetermined order of allocation being related with said efficiency metric;
  (d) populating a plurality of actual data spaces substantially corresponding with said plurality of virtual data spaces according to said virtual allocating; and
  (e) ending the method for said frame.

19. The method for allocating data in a frame for use in a communication system as recited in claim 18 wherein step (d) includes evaluating said quality of service metric to determine whether to allocate still-unallocated flows of said plurality of flows to wastage spaces remaining in said frame before effecting said populating.

20. The method for constructing an orthogonal frequency division multiplexing access frame for use in a communication system as recited in claim 19 wherein said wastage metric evaluated a amount of capacity remaining with a respective said data space after allocation of said plurality of flows from a respective said data group to said respective data space.

* * * * *